United States Patent
Shuey et al.

(10) Patent No.: US 7,545,285 B2
(45) Date of Patent: Jun. 9, 2009

(54) LOAD CONTROL UNIT IN COMMUNICATION WITH A FIXED NETWORK METER READING SYSTEM

(75) Inventors: Kenneth C. Shuey, Zebulon, NC (US); Andrew J. Borleske, Garner, NC (US); Robert T. Mason, Jr., Raleigh, NC (US); David G. Hart, Raleigh, NC (US)

(73) Assignee: Elster Electricity, LLC, Raleigh, NC (US)

( * ) Notice: Subject to any disclaimer, the term of this patent is extended or adjusted under 35 U.S.C. 154(b) by 72 days.

(21) Appl. No.: 11/355,690

(22) Filed: Feb. 16, 2006

(65) Prior Publication Data

US 2007/0205915 A1    Sep. 6, 2007

(51) Int. Cl.
*G08C 19/16* (2006.01)
(52) U.S. Cl. .................. 340/870.02; 700/276; 700/291; 702/62
(58) Field of Classification Search ............ 340/870.01, 340/870.39, 870.02; 702/62; 700/276, 291
See application file for complete search history.

(56) References Cited

U.S. PATENT DOCUMENTS

| | | | |
|---|---|---|---|
| 3,445,815 A | 5/1969 | Saltzberg et al. ............ 340/163 |
| 3,858,212 A | 12/1974 | Tompkins et al. ..... 343/100 CS |
| 3,878,512 A | 4/1975 | Kobayashi et al. ...... 340/168 R |
| 3,973,240 A | 8/1976 | Fong .......................... 340/151 |
| 4,031,513 A | 6/1977 | Simciak ................... 340/152 T |
| 4,056,107 A | 11/1977 | Todd et al. .................... 130/27 |
| 4,066,964 A | 1/1978 | Costanza et al. .............. 325/55 |
| 4,132,981 A | 1/1979 | White ........................ 340/203 |
| 4,190,800 A | 2/1980 | Kelly, Jr. et al. .............. 325/37 |
| 4,204,195 A | 5/1980 | Bogacki ..................... 340/151 |
| 4,218,737 A | 8/1980 | Buscher et al. ............. 364/493 |
| 4,250,489 A | 2/1981 | Dudash et al. .............. 340/147 |
| 4,254,472 A | 3/1981 | Juengel et al. .............. 364/900 |

(Continued)

FOREIGN PATENT DOCUMENTS

CH          682196 A5       7/1993

(Continued)

OTHER PUBLICATIONS

In the United States Patent and Trademark Office: Non-Final Office Action in U.S. Appl. No. 11/355,548, filed Feb. 16, 2006, dated Sep. 14, 2007, 43 pages.

(Continued)

*Primary Examiner*—Timothy Edwards, Jr.
(74) *Attorney, Agent, or Firm*—Woodcock Washburn LLP (57) ABSTRACT

A load control system that communicates with existing automated meter reading communications systems to interrupt and shed loads at a customer location. The system includes a master controller that listens to communications between a utility meter and the reading system. The controller receives tier and/or pricing information and will instruct a load control unit to interrupt certain loads based on the information. In addition, the system may be employed as a load shedding system where a command may be forwarded to the master controller to disconnect loads based on action levels. The command may be sent via a TCP/IP communications system to a node in the reading system and the forwarded via a radio network to the master controller to reduce latency. Predictive shedding may be performed based on forecast loads.

19 Claims, 3 Drawing Sheets

U.S. PATENT DOCUMENTS

| | | | |
|---|---|---|---|
| 4,319,358 A | 3/1982 | Sepp | 375/1 |
| 4,321,582 A | 3/1982 | Banghart | 340/310 |
| 4,322,842 A | 3/1982 | Martinez | 370/204 |
| 4,328,581 A | 5/1982 | Harmon et al. | 371/8 |
| 4,361,851 A | 11/1982 | Asip et al. | 358/84 |
| 4,361,890 A | 11/1982 | Green, Jr. et al. | 375/1 |
| 4,396,915 A | 8/1983 | Farnsworth et al. | 340/870.03 |
| 4,405,829 A | 9/1983 | Rivest et al. | 178/22.14 |
| 4,415,896 A | 11/1983 | Allgood | 340/870.03 |
| 4,466,001 A | 8/1984 | Moore et al. | 340/825.08 |
| 4,504,831 A | 3/1985 | Jahr et al. | 340/870.03 |
| 4,506,386 A | 3/1985 | Ichikawa et al. | 455/343 |
| 4,513,415 A | 4/1985 | Martinez | 370/92 |
| 4,525,861 A | 6/1985 | Freeburg | 455/33 |
| 4,600,923 A | 7/1986 | Hicks et al. | 340/870.02 |
| 4,608,699 A | 8/1986 | Batlivala et al. | 375/216 |
| 4,611,333 A | 9/1986 | McCallister et al. | 375/1 |
| 4,614,945 A | 9/1986 | Brunius et al. | 340/870.03 |
| 4,617,566 A | 10/1986 | Diamond | 340/870.11 |
| 4,628,313 A | 12/1986 | Gombrich et al. | 340/870.02 |
| 4,631,538 A | 12/1986 | Carreno | 340/870.18 |
| 4,638,298 A | 1/1987 | Spiro | 340/827 |
| 4,644,321 A | 2/1987 | Kennon | 340/310 |
| 4,653,076 A | 3/1987 | Jerrim et al. | 375/115 |
| 4,672,555 A | 6/1987 | Hart et al. | 700/276 |
| 4,680,704 A | 7/1987 | Konicek et al. | 364/525 |
| 4,688,038 A | 8/1987 | Giammarese | 340/870.02 |
| 4,692,761 A | 9/1987 | Robinton | 340/825 |
| 4,707,852 A | 11/1987 | Jahr et al. | 379/107 |
| 4,713,837 A | 12/1987 | Gordon | 379/93 |
| 4,724,435 A | 2/1988 | Moses et al. | 340/870.13 |
| 4,728,950 A | 3/1988 | Hendrickson et al. | 340/870.31 |
| 4,734,680 A | 3/1988 | Gehman et al. | 340/539 |
| 4,749,992 A | 6/1988 | Fitzemeyer et al. | 340/870.02 |
| 4,757,456 A | 7/1988 | Benghiat | 364/464 |
| 4,769,772 A | 9/1988 | Dwyer | 364/300 |
| 4,783,748 A | 11/1988 | Swarztrauber et al. | 364/483 |
| 4,792,946 A | 12/1988 | Mayo | 370/338 |
| 4,799,059 A | 1/1989 | Grindahl et al. | 340/870.03 |
| 4,804,938 A | 2/1989 | Rouse et al. | 340/310 |
| 4,804,957 A | 2/1989 | Selph et al. | 340/870.03 |
| 4,811,011 A | 3/1989 | Sollinger | 340/870.02 |
| 4,827,514 A | 5/1989 | Ziolko et al. | 380/48 |
| 4,833,618 A | 5/1989 | Verma et al. | 364/483 |
| 4,839,645 A | 6/1989 | Lill | 340/870.17 |
| 4,841,545 A | 6/1989 | Endo et al. | 375/1 |
| 4,860,379 A | 8/1989 | Schoeneberger et al. | 455/5 |
| 4,862,493 A | 8/1989 | Venkataraman et al. | 379/107 |
| 4,868,877 A | 9/1989 | Fischer | 380/25 |
| 4,884,021 A | 11/1989 | Hammond et al. | 324/142 |
| 4,912,722 A | 3/1990 | Carlin | 375/1 |
| 4,922,518 A | 5/1990 | Gordon et al. | 379/57 |
| 4,939,726 A | 7/1990 | Flammer et al. | 370/94.1 |
| 4,940,974 A | 7/1990 | Sojka | 340/825.08 |
| 4,940,976 A | 7/1990 | Gastouniotis et al. | 340/870.02 |
| 4,958,359 A | 9/1990 | Kato | 375/1 |
| 4,964,138 A | 10/1990 | Nease et al. | 375/1 |
| 4,965,533 A | 10/1990 | Gilmore | 331/18 |
| 4,972,507 A | 11/1990 | Lusignan | 455/51 |
| 4,977,515 A * | 12/1990 | Rudden et al. | 700/296 |
| 5,007,052 A | 4/1991 | Flammer | 370/85.6 |
| 5,018,165 A | 5/1991 | Sohner et al. | 375/1 |
| 5,022,046 A | 6/1991 | Morrow, Jr. | 375/1 |
| 5,032,833 A | 7/1991 | Laporte | 340/825.02 |
| 5,053,766 A | 10/1991 | Ruiz-del-Portal et al. | 340/870.02 |
| 5,053,774 A | 10/1991 | Schuermann et al. | 342/44 |
| 5,056,107 A | 10/1991 | Johnson et al. | 375/1 |
| 5,067,136 A | 11/1991 | Arthur et al. | 375/1 |
| 5,079,715 A | 1/1992 | Venkataraman et al. | 364/481 |
| 5,079,768 A | 1/1992 | Flammer | 370/94.1 |
| 5,086,292 A | 2/1992 | Johnson et al. | 340/637 |
| 5,086,385 A | 2/1992 | Launey | 364/188 |
| 5,090,024 A | 2/1992 | Vander Mey et al. | 375/1 |
| 5,111,479 A | 5/1992 | Akazawa | 375/1 |
| 5,115,433 A | 5/1992 | Baran et al. | 370/94.3 |
| 5,115,448 A | 5/1992 | Mori | 375/1 |
| 5,129,096 A | 7/1992 | Burns | 455/18 |
| 5,130,987 A | 7/1992 | Flammer | 370/103 |
| 5,132,985 A | 7/1992 | Hashimoto et al. | 375/1 |
| 5,136,614 A | 8/1992 | Hiramatsu et al. | 375/1 |
| 5,142,694 A | 8/1992 | Jackson et al. | 455/67.1 |
| 5,151,866 A | 9/1992 | Glaser et al. | 364/483 |
| 5,155,481 A | 10/1992 | Brennan, Jr. et al. | 340/870.02 |
| 5,160,926 A | 11/1992 | Schweitzer, III | 340/870.02 |
| 5,166,664 A | 11/1992 | Fish | 340/539 |
| 5,177,767 A | 1/1993 | Kato | 375/1 |
| 5,179,376 A | 1/1993 | Pomatto | 340/870.02 |
| 5,189,694 A | 2/1993 | Garland | 379/106 |
| 5,194,860 A | 3/1993 | Jones et al. | 340/370.02 |
| 5,197,095 A | 3/1993 | Bonnet | 379/107 |
| 5,204,877 A | 4/1993 | Endo et al. | 375/1 |
| 5,214,587 A | 5/1993 | Green | 364/464.04 |
| 5,225,994 A | 7/1993 | Arinobu et al. | 364/492 |
| 5,228,029 A | 7/1993 | Kotzin | 370/95.1 |
| 5,229,996 A | 7/1993 | Bäckström et al. | 370/100.1 |
| 5,239,575 A | 8/1993 | White et al. | 379/107 |
| 5,239,584 A | 8/1993 | Hershey et al. | 380/28 |
| 5,243,338 A | 9/1993 | Brennan, Jr. et al. | 340/870.02 |
| 5,252,967 A | 10/1993 | Brennan et al. | 340/870.02 |
| 5,260,943 A | 11/1993 | Comroe et al. | 370/95.1 |
| 5,270,704 A | 12/1993 | Sosa Quintana et al. | 340/870.02 |
| 5,280,498 A | 1/1994 | Tymes et al. | 375/1 |
| 5,280,499 A | 1/1994 | Suzuki | 375/1 |
| 5,285,469 A | 2/1994 | Vanderpool | 375/1 |
| 5,287,287 A | 2/1994 | Chamberlain et al. | 364/483 |
| 5,289,497 A | 2/1994 | Jacobson et al. | 375/1 |
| 5,295,154 A | 3/1994 | Meier et al. | 375/1 |
| 5,307,349 A | 4/1994 | Shloss et al. | 370/85.2 |
| 5,311,541 A | 5/1994 | Sanderford, Jr. | 375/1 |
| 5,311,542 A | 5/1994 | Eder | 375/1 |
| 5,315,531 A | 5/1994 | Oravetz et al. | 364/550 |
| 5,319,679 A | 6/1994 | Bagby | 375/106 |
| 5,329,547 A | 7/1994 | Ling | 375/1 |
| 5,345,225 A | 9/1994 | Davis | 340/635 |
| 5,359,625 A | 10/1994 | Vander Mey et al. | 375/1 |
| 5,377,222 A | 12/1994 | Sanderford, Jr. | 375/1 |
| 5,381,462 A | 1/1995 | Larson et al. | 379/107 |
| 5,383,134 A | 1/1995 | Wrzesinski | 364/514 |
| 5,384,712 A | 1/1995 | Oravetz et al. | 364/550 |
| 5,387,873 A | 2/1995 | Muller et al. | 327/155 |
| 5,390,360 A | 2/1995 | Scop et al. | 455/34.2 |
| 5,406,495 A | 4/1995 | Hill | 364/483 |
| 5,416,917 A | 5/1995 | Adair et al. | 395/500 |
| 5,420,799 A | 5/1995 | Peterson et al. | 364/483 |
| 5,428,636 A | 6/1995 | Meier | 375/202 |
| 5,430,759 A | 7/1995 | Yokev et al. | 375/202 |
| 5,432,507 A | 7/1995 | Mussino et al. | 340/870.03 |
| 5,432,815 A | 7/1995 | Kang et al. | 375/200 |
| 5,438,329 A | 8/1995 | Gastouniotis et al. | 340/870.02 |
| 5,448,230 A | 9/1995 | Schanker et al. | 340/870.03 |
| 5,448,570 A | 9/1995 | Toda et al. | 370/95.3 |
| 5,450,088 A | 9/1995 | Meier et al. | 342/51 |
| 5,452,465 A | 9/1995 | Geller et al. | 395/800 |
| 5,455,533 A | 10/1995 | Köllner | 327/484 |
| 5,455,544 A | 10/1995 | Kechkaylo | 332/103 |
| 5,455,569 A | 10/1995 | Sherman et al. | 340/825.02 |
| 5,455,822 A | 10/1995 | Dixon et al. | 370/18 |
| 5,457,713 A | 10/1995 | Sanderford, Jr. et al. | 375/206 |
| 5,461,558 A | 10/1995 | Patsiokas et al. | 364/145 |
| 5,463,657 A | 10/1995 | Rice | 375/200 |
| 5,473,322 A | 12/1995 | Carney | 340/870.02 |
| 5,475,742 A | 12/1995 | Gilbert | 379/106 |

| Patent No. | Kind | Date | Inventor | Class |
|---|---|---|---|---|
| 5,475,867 | A | 12/1995 | Blum | 455/53.1 |
| 5,479,442 | A | 12/1995 | Yamamoto | 375/206 |
| 5,481,259 | A | 1/1996 | Bane | 340/870.03 |
| 5,488,608 | A | 1/1996 | Flammer, III | 370/85.13 |
| 5,491,473 | A | 2/1996 | Gilbert | 340/870.01 |
| 5,493,287 | A | 2/1996 | Bane | 340/825.52 |
| 5,495,239 | A | 2/1996 | Ouellette | 340/870.02 |
| 5,497,424 | A | 3/1996 | Vanderpool | 380/34 |
| 5,499,243 | A | 3/1996 | Hall | 370/85.8 |
| 5,500,871 | A | 3/1996 | Kato et al. | 375/208 |
| 5,511,188 | A | 4/1996 | Pascucci et al. | 395/600 |
| 5,519,388 | A | 5/1996 | Adair, Jr. | 340/870.02 |
| 5,521,910 | A | 5/1996 | Matthews | 370/54 |
| 5,522,044 | A | 5/1996 | Pascucci et al. | 395/200.06 |
| 4,749,992 | A | 6/1996 | Fitzmeyer et al. | 340/870.02 |
| 5,524,280 | A | 6/1996 | Douthitt et al. | 455/62 |
| 5,525,898 | A | 6/1996 | Lee, Jr. et al. | 324/142 |
| 5,526,389 | A | 6/1996 | Buell et al. | 375/200 |
| 5,528,507 | A | 6/1996 | McNamara et al. | 364/483 |
| 5,528,597 | A | 6/1996 | Gerszberg et al. | 370/95.3 |
| 5,539,775 | A | 7/1996 | Tuttle et al. | 375/200 |
| 5,541,589 | A | 7/1996 | Delaney | 340/870.02 |
| 5,544,036 | A | 8/1996 | Brown, Jr. et al. | 364/145 |
| 5,546,424 | A | 8/1996 | Miyake | 375/206 |
| 5,548,527 | A | 8/1996 | Hemminger et al. | 364/492 |
| 5,548,633 | A | 8/1996 | Kujawa et al. | 379/93 |
| 5,553,094 | A | 9/1996 | Johnson et al. | 375/200 |
| 5,555,508 | A | 9/1996 | Munday et al. | 364/492 |
| 5,559,870 | A | 9/1996 | Patton et al. | 379/107 |
| 5,566,332 | A | 10/1996 | Adair et al. | 395/600 |
| 5,570,084 | A | 10/1996 | Ritter et al. | 340/825.05 |
| 5,572,438 | A | 11/1996 | Ehlers et al. | 364/492 |
| 5,574,657 | A | 11/1996 | Tofte et al. | 364/510 |
| 5,590,179 | A | 12/1996 | Shincovich et al. | 379/107 |
| 5,592,470 | A | 1/1997 | Rudrapatna et al. | 370/320 |
| 5,594,740 | A | 1/1997 | LaDue | 379/59 |
| 5,602,744 | A | 2/1997 | Meek et al. | 364/464.22 |
| 5,617,084 | A | 4/1997 | Sears | 331/176 |
| 5,619,192 | A | 4/1997 | Ayala | 340/870.02 |
| 5,619,685 | A | 4/1997 | Schiavone | 395/500 |
| 5,621,629 | A | 4/1997 | Hemminer et al. | 363/56 |
| 5,627,759 | A | 5/1997 | Bearden et al. | 364/483 |
| 5,631,636 | A | 5/1997 | Bane | 340/825.69 |
| 5,636,216 | A | 6/1997 | Fox et al. | 370/402 |
| 5,640,679 | A | 6/1997 | Lundqvist et al. | 455/33.2 |
| 5,659,300 | A | 8/1997 | Dresselhuys et al. | 340/870.02 |
| 5,668,803 | A | 9/1997 | Tymes et al. | 370/312 |
| 5,668,828 | A | 9/1997 | Sanderford, Jr. et al. | 375/202 |
| 5,673,252 | A | 9/1997 | Johnson et al. | 370/449 |
| 5,684,472 | A | 11/1997 | Bane | 340/870.02 |
| 5,684,799 | A | 11/1997 | Bigham et al. | 370/397 |
| 5,691,715 | A | 11/1997 | Ouellette | 340/870.09 |
| 5,692,180 | A | 11/1997 | Lee | 395/610 |
| 5,696,501 | A | 12/1997 | Ouellette et al. | 340/870.02 |
| 5,696,765 | A | 12/1997 | Safadi | 370/436 |
| 5,696,903 | A | 12/1997 | Mahany | 395/200.58 |
| 5,699,276 | A | 12/1997 | Roos | 364/514 A |
| 5,714,931 | A | 2/1998 | Petite et al. | 340/539 |
| 5,715,390 | A | 2/1998 | Hoffman et al. | 395/188.01 |
| 5,717,604 | A | 2/1998 | Wiggins | 364/514 C |
| 5,719,564 | A | 2/1998 | Sears | 340/870.02 |
| 5,745,901 | A | 4/1998 | Entner et al. | 707/103 |
| 5,748,104 | A | 5/1998 | Argyroudis et al. | 340/870.11 |
| 5,748,619 | A | 5/1998 | Meier | 370/278 |
| 5,751,914 | A | 5/1998 | Coley et al. | 395/51 |
| 5,751,961 | A | 5/1998 | Smyk | 395/200.47 |
| 5,754,772 | A | 5/1998 | Leaf | 395/200.33 |
| 5,754,830 | A | 5/1998 | Butts et al. | 395/500 |
| 5,757,783 | A | 5/1998 | Eng et al. | 370/315 |
| 5,768,148 | A | 6/1998 | Murphy et al. | 364/492 |
| 5,778,368 | A | 7/1998 | Hogan et al. | 707/10 |
| 5,787,437 | A | 7/1998 | Potterveld et al. | 707/103 |
| 5,790,789 | A | 8/1998 | Suarez | 395/200.32 |
| 5,790,809 | A | 8/1998 | Holmes | 395/200.58 |
| 5,801,643 | A | 9/1998 | Williams et al. | 340/870.02 |
| 5,805,712 | A | 9/1998 | Davis | 380/50 |
| 5,808,558 | A | 9/1998 | Meek et al. | 340/870.01 |
| 5,809,059 | A | 9/1998 | Souissi et al. | 375/202 |
| 5,822,521 | A | 10/1998 | Gartner et al. | 395/200.6 |
| 5,850,187 | A | 12/1998 | Carrender et al. | 340/10.42 |
| 5,862,391 | A | 1/1999 | Salas et al. | 395/750.01 |
| 5,872,774 | A | 2/1999 | Wheatley, III et al. | 370/335 |
| 5,874,903 | A | 2/1999 | Shuey et al. | 340/870.02 |
| 5,875,183 | A | 2/1999 | Nitadori | 370/328 |
| 5,875,402 | A | 2/1999 | Yamawaki | 455/502 |
| 5,884,184 | A | 3/1999 | Sheffer | 455/521 |
| 5,892,758 | A | 4/1999 | Argyroudis | 370/335 |
| 5,896,382 | A | 4/1999 | Davis et al. | 370/401 |
| 5,897,607 | A | 4/1999 | Jenney et al. | 702/62 |
| 5,898,387 | A | 4/1999 | Davis et al. | 340/870.02 |
| 5,907,491 | A | 5/1999 | Canada et al. | 364/468.15 |
| 5,907,540 | A | 5/1999 | Hayashi | 370/315 |
| 5,910,799 | A | 6/1999 | Carpenter et al. | 345/333 |
| 5,923,269 | A | 7/1999 | Shuey et al. | 340/870.02 |
| 5,926,103 | A | 7/1999 | Petite | 340/825.19 |
| 5,926,531 | A | 7/1999 | Petite | 379/144 |
| 5,943,375 | A | 8/1999 | Veintimilla | 375/355 |
| 5,944,842 | A | 8/1999 | Propp et al. | 714/701 |
| 5,953,319 | A | 9/1999 | Dutta et al. | 370/238 |
| 5,958,018 | A | 9/1999 | Eng et al. | |
| 5,959,550 | A | 9/1999 | Giles | 340/870.02 |
| 5,960,074 | A | 9/1999 | Clark | 379/310 |
| 5,963,146 | A | 10/1999 | Johnson et al. | 340/870.1 |
| 5,974,236 | A | 10/1999 | Sherman | 395/200.51 |
| 5,986,574 | A | 11/1999 | Colton | 340/870.02 |
| 6,000,034 | A | 12/1999 | Lightbody et al. | 713/202 |
| 6,028,522 | A | 2/2000 | Petite | 340/641 |
| 6,034,988 | A | 3/2000 | VanderMey et al. | 375/202 |
| 6,035,201 | A | 3/2000 | Whitehead | 455/455 |
| 6,041,056 | A | 3/2000 | Bigham et al. | 370/395 |
| 6,061,604 | A | 5/2000 | Russ et al. | 700/90 |
| 6,067,029 | A | 5/2000 | Durston | 340/870.03 |
| 6,073,169 | A | 6/2000 | Shuey et al. | 709/217 |
| 6,073,174 | A | 6/2000 | Montgomerie et al. | 709/224 |
| 6,078,251 | A | 6/2000 | Landt et al. | 340/10.41 |
| 6,078,909 | A | 6/2000 | Knutson | 705/59 |
| 6,088,659 | A | 7/2000 | Kelley et al. | 702/62 |
| 6,091,758 | A | 7/2000 | Ciccone et al. | 375/132 |
| 6,100,817 | A | 8/2000 | Mason, Jr. et al. | 340/870.02 |
| 6,112,192 | A | 8/2000 | Capek | 705/59 |
| 6,124,806 | A | 9/2000 | Cunningham et al. | 340/870.02 |
| 6,128,276 | A | 10/2000 | Agee | 370/288 |
| 6,137,423 | A | 10/2000 | Glorioso et al. | 340/870.02 |
| 6,150,955 | A | 11/2000 | Tracy et al. | 340/870.02 |
| 6,154,487 | A | 11/2000 | Murai et al. | 375/150 |
| 6,160,933 | A | 12/2000 | Laude | 455/12.1 |
| 6,160,993 | A | 12/2000 | Wilson | 455/12.1 |
| 6,172,616 | B1 | 1/2001 | Johnson et al. | 340/870.12 |
| 6,195,018 | B1 | 2/2001 | Ragle et al. | 340/870.01 |
| 6,199,068 | B1 | 3/2001 | Carpenter | 707/100 |
| 6,208,266 | B1 | 3/2001 | Lyons et al. | 340/870.02 |
| 6,218,953 | B1 | 4/2001 | Petite | 340/641 |
| 6,233,327 | B1 | 5/2001 | Petite | 379/155 |
| 6,246,677 | B1 | 6/2001 | Nap et al. | 370/346 |
| 6,249,516 | B1 | 6/2001 | Brownrigg et al. | 370/338 |
| 6,333,975 | B1 | 12/2001 | Brunn et al. | 379/106.03 |
| 6,363,057 | B1 | 3/2002 | Ardalan et al. | 370/252 |
| 6,393,341 | B1 | 5/2002 | Lawrence et al. | 700/286 |
| 6,396,839 | B1 | 5/2002 | Ardalan et al. | 370/401 |
| 6,421,731 | B1 | 7/2002 | Ciotti, Jr. et al. | 709/238 |
| 6,430,268 | B1 | 8/2002 | Petite | 379/39 |
| 6,437,692 | B1 | 8/2002 | Petite et al. | 340/540 |
| 6,446,192 | B1 | 9/2002 | Narasimhan et al. | 712/29 |
| 6,643,278 | B1 | 11/2003 | Panasik et al. | 370/330 |
| 6,657,549 | B1 | 12/2003 | Avery | 340/825.49 |
| 6,684,245 | B1 | 1/2004 | Shuey et al. | 709/223 |

| | | | |
|---|---|---|---|
| 6,751,563 B2 | 6/2004 | Spanier et al. | 702/61 |
| 6,867,707 B1 | 3/2005 | Kelley et al. | 340/870.02 |
| 2001/0002210 A1 | 5/2001 | Petite | 379/155 |
| 2001/0024163 A1 | 9/2001 | Petite | 340/628 |
| 2002/0012323 A1 | 1/2002 | Petite et al. | 370/252 |
| 2002/0013679 A1 | 1/2002 | Petite | 702/188 |
| 2002/0019712 A1 | 2/2002 | Petite et al. | 702/61 |
| 2002/0019725 A1 | 2/2002 | Petite | 702/188 |
| 2002/0026957 A1 | 3/2002 | Reyman | 137/39 |
| 2002/0027504 A1 | 3/2002 | Davis et al. | 340/540 |
| 2002/0031101 A1 | 3/2002 | Petite et al. | 370/310 |
| 2002/0094799 A1 | 7/2002 | Elliott et al. | 455/405 |
| 2002/0125998 A1 | 9/2002 | Petite et al. | 340/286.01 |
| 2002/0145537 A1 | 10/2002 | Mueller et al. | 340/870.02 |
| 2002/0169643 A1 | 11/2002 | Petite et al. | 705/5 |
| 2003/0036810 A1 | 2/2003 | Petite | 700/9 |
| 2003/0036822 A1 | 2/2003 | Davis et al. | 700/295 |
| 2003/0123442 A1 | 7/2003 | Drucker et al. | 370/392 |
| 2003/0202512 A1 | 10/2003 | Kennedy | 370/389 |
| 2004/0001008 A1 | 1/2004 | Shuey et al. | 340/870.02 |
| 2004/0113810 A1 | 6/2004 | Mason, Jr. et al. | 340/870.02 |
| 2005/0184881 A1 | 8/2005 | Dusenberry et al. | 340/870.02 |
| 2005/0270173 A1 | 12/2005 | Boaz | 340/870.02 |
| 2006/0052906 A1* | 3/2006 | Kates | 700/295 |
| 2006/0111796 A1* | 5/2006 | Van Heteren | 700/20 |
| 2007/0043477 A1* | 2/2007 | Ehlers et al. | 700/276 |

FOREIGN PATENT DOCUMENTS

| | | |
|---|---|---|
| EP | 0 395 495 A1 | 10/1990 |
| EP | 0 446 979 A1 | 9/1991 |
| EP | 0 629 098 A2 | 12/1994 |
| GB | 2 118 340 A | 10/1983 |
| GB | 2 157 448 A | 10/1985 |
| GB | 2 186 404 A | 8/1987 |
| GB | 02 222 898 A | 3/1990 |
| GB | 2 237 910 A | 5/1991 |
| JP | 59-229949 | 12/1984 |
| JP | 02-67967 | 3/1990 |
| JP | 02-67967 A | 3/1990 |
| JP | 4290593 A | 10/1992 |
| JP | 05-260569 | 10/1993 |
| JP | 8194023 A | 7/1996 |
| WO | 93/02515 A1 | 2/1993 |
| WO | 93/04451 A1 | 3/1993 |
| WO | 95/32595 A1 | 11/1995 |
| WO | 96/10856 A1 | 4/1996 |
| WO | WO 2004/004364 A2 | 1/2004 |

OTHER PUBLICATIONS

In the United States Patent and Trademark Office: Reply Transmittal Letter, Reply Responsive to Office Action in U.S. Appl. No. 11/355,548 filed Feb. 16, 2006, dated Mar. 14, 2008, 13 pages.

Desbonnet, Joe et al., "System Architecture and Implementation of CEBus/Internet Gateway", IEEE, 1997, 1057-1062.

Markwalter, Brian et al., "CEBus Network Layer Description", IEEE, 1989, 571-575.

Newtown, Harry, Newton's Telecom Dictionary, Flatiron Publishing, Inc., 10th Ed., 1996, LAN (1 of 1): Cebus Overview (1-3): Cebus Industry Council (1 of 1).

Newtown, Harry, Newton's Telecom Dictionary, 10th Edition, 1996, 243.

International Search Report issued in International Application No. PCT/US98/11170 Date of Mailing: Oct. 7, 1998.

International Search Report issued in International Application No. PCT/US98/19034 Date of Mailing: Feb. 1, 1999.

Internet Printout, http://www.ram.com BellSouth Wireless Data—Paging, Mobitex, Network, Business, Sep. 23, 1998:—Mobitex®: The Heart of Every BellSouth Solution—Mobitex Features and Services: RAM Mobile Data White Paper, Feb. 1997—Narrowband PCS Technologies: What are the Options?: RAM Mobile Data White Paper, Nov. 1997—The Inherent Security of Data Over Mobitex Wireless Packet Data Networks, A RAM Mobile Data White Paper, Oct. 1995—Comparative Analysis of Coverage and Performance: RAM & Ardis, 1998.

Internet Printout, http://www.ardis.com "Ardis Two-Way, Wireless Data Communications," ARDIS, Sep. 23, 1998.

Internet Printout, http://ww.ardis.com/RADIO "An Overview of Radio Coverage," Sep. 29, 1998 "Radio Propagation," Sep. 29, 1998 "Factors Affecting ARDIS Coverage," Sep. 29, 1998 "The Ardis Network Compared to Other Systems," Sep. 29, 1998.

Internet Printout, http://www.ardis.com/RADIO "Radio Coverage," Sep. 29, 1998 "Glossary of Terms," Sep. 29, 1998 "Radio Propagation in Free Space," Sep. 29, 1998 "Real World Propagation Variations," Sep. 29, 1998 "Probability of Reception vs. Calculation," Sep. 29, 1998.

"MV-90 Read Only System" UTS Software Solutions For Utility Customers. (No Date). (No Page Numbers or Pages).

Rappaport, T. S., "Wireless Communications, Principles and Practice," Prentice Hall PTR, 1996, pp. 410-413.

Brochure: TRF6900 Single-Chip RF Transceiver, Texas Instrument, 2001 ©.

Corcoran, P.M. et al., "CEBus Network Access via the World-Wide-Web", International Conference on Consumer Electronics, Jun. 5-7, 1996, 236-237, XP-002218722.

Corcoran, P.M. et al., "Browser-Style Interfaces to a Home Automation Network", IEEE Trans. On Consumer Electronics, Nov. 1, 1997, 43(4), 1063-1069, XP-000768559.

Norenkov, et al., Telecommunication Technologies and Networks, Moscow Bauman Technical School, 1988, (Signed for publication on Dec. 10, 1997), pp. 116-118, 80-87 [1] English Language Abstract Provided.

Brownrigg, E. Ph.D., "Developing the Information Superhighway Issues for Libraries", Library Perspectives on NREN, The National Research and Education Network, 1990, 55-63.

Brownrigg, E.B., "The Internet as an External Economy: The Emergence of the Invisible Hand", Library Administration and Management, 1991, 95-97.

Frankel, M.S., "Packet Radios Provide Link for Distributed, Survivable C3 in Post-Attack Scenarios", MSN, Jun. 1983, 80-108.

Gower, N. et al., "Congestion Control Using Pacing in a Packet Radio Network", IEEE Military Communications Conference, 1982, 1, 23.1-1, 23-1-6.

Jubin, J., "Current Packet Radio Networks Protocols", IEEE Infocom Proceedings, 1985, 86-92.

Kahn, R.E., "The Organization of Computer Resources into a Packet Radio Network", IEEE Transactions on Communications, 1977, 25(1), 169-178.

Kahn, R.E., et al., "Advances in Packet Radio Technology", proceedings of the IEEE, 1978, 66(11), 1468-1496.

Lauer, G. et al., "Survivable Protocols for Large Scale Packet Radio Networks", IEEE Global Telecommunications Conference, 1984, 468-471.

Lynch, C.A. et al., "Electronic Publishing, Electronic Imaging, and Document Delivery", Electronic Imaging, International Electronic Imaging Exposition & Conference, 1986, 662-667.

Lynch, C.A. et al., "The Telecommunications Landscape", 1986, 7 pages.

Lynch, C.A. et al., "Routing, Repeating, Power Control and Directional Techniques", Packet Radio Networks, Architectures, Protocols, Technologies and Applications, 1987, Ch 5, 105-129, 259-274.

MacGregor, W. et al., "Multiple Control Stations in Packet Radio Networks", IEEE Military Communications Conference, 1982, 10.3-1-10.3-5.

Shachan, N. et al., "A Packet Radio Network for Library Automation", IEEE Military Communications Conference, 1987, 2, 21.3.1-21.3.7.

Shacham, N. et al., "Future Directions in Packet Radio Technology", IEEE Infocom Proceedings, 1985, 93-98.

Westcott, J.A., "Issues in Distributed Routing for Mobile Packet Radio Networks", IEEE, 1982, 233-238.

Wescott, J. et al., "A Distributed Routing Design for a Broadcast Environment", IEEE Military Communications Conference, 1982, 10.4-1-10.4-5.

"Packet Radio: Applications for Libraries in Developing Countries", *UDT Series on Data Communication Technologies and Standards for Libraries*, 1993, Ch 1-6, 87 pages.

Chlamtac, I. et al., "Optimizing the System of Virtual Paths", *IEEE ACM Transactions on Networking*, 1994, 2(6), 581-586.

Leung, V.C.M., "Internetworking Wireless Terminals to Local Area Networks Via Radio Bridges", *ICWC*, 1992, 126-129.

Pollini, G.P. et al., "Path Optimization Procedures for Efficient Routing of Information after an Inter-Switch Handover", *IEEE*, 1994, 1-5.

Rajagopalan, B. et al., "A New Responsive Distributed Shortest-Path Routing Algorithm", *ACM*, 1989, 237-246.

* cited by examiner

LOAD CONTROL UNIT IN COMMUNICATION WITH A FIXED NETWORK METER READING SYSTEM

FIELD OF THE INVENTION

The present invention relates to an energy management system, and more particularly, to systems and methods for controlling or shedding loads at a customer location via a fixed network meter reading system.

BACKGROUND OF THE INVENTION

Loads at a customer location may be curtailed or interrupted during power system events for several reasons. Depending on the driver, the load reduction may be initiated by the utility or by the customer. For the customer, load reduction is generally an attempt to decrease energy consumption during certain periods of time to reduce costs. Predetermined loads such as HVAC, hot water heaters, pool pumps, or other high consumption devices can be selected for energy interruption to reduce the overall consumption when higher energy prices are in effect.

For the utility, load shedding at a customer site may be accomplished because of an abnormal condition on the power network. Abnormal conditions include events such as loss of transmission capability due to a line outage, loss of generation, loss of inter-tie to adjacent power networks, unusually high peak demand or similar type events. In this case the utility may take different steps to decrease consumption via load shedding. Load shedding can be initiated at the substation level using frequency-based relays. Many customers may contractually elect to have non-critical loads interrupted at customer premises for a reduction in overall energy costs. In order for this to be effective, the utility traditionally interrupts certain loads for a few minutes to maybe hours in order to reduce the overall load on a transmission network.

One drawback of such systems is that they require additional equipment at a customer premises and additional systems to manage the equipment. With the rapid growth in fixed network automated reading systems, it would advantageous if such systems could be used to manage load control systems to reduce the amount of equipment and systems necessary to implement load control and shedding. The present invention provides such a system.

SUMMARY OF THE INVENTION

The invention provides a system and method for providing load control. The load control systems communicate with existing automated meter reading communications systems to interrupt and shed loads at a customer location. The system includes a master controller that listens to communications between a utility meter and the reading system. The controller receives tier and/or pricing information and will instruct a load control unit to interrupt certain loads based on the information. In addition, the system may be employed as a load shedding system where a command may be forwarded to the master controller to disconnect loads based on action levels. The command may be sent via a TCP/IP communications system to a node in the reading system and the forwarded via a radio network to the master controller to reduce latency. Predictive shedding may be performed based on forecast loads.

These and other novel features will be described in further detail below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Exemplary systems and methods for gathering meter data are described below with reference to FIGS. 1-2. It will be appreciated by those of ordinary skill in the art that the description given herein with respect to those figures is for exemplary purposes only and is not intended in any way to limit the scope of potential embodiments.

Generally, a plurality of meter devices, which operate to track usage of a service or commodity such as, for example, electricity, water and gas, may be operable to wirelessly communicate with each other and/or to communicate with one another via a wireline network. A collector may be operable to automatically identify and register meters for communication with the collector. When a meter is installed, the meter becomes registered with the collector that can provide a communication path to the meter. The collectors may receive and compile metering data from a plurality of meter devices via wireless communications. Also, a communications server communicates with the collectors to retrieve the compiled meter data.

Figure 1:
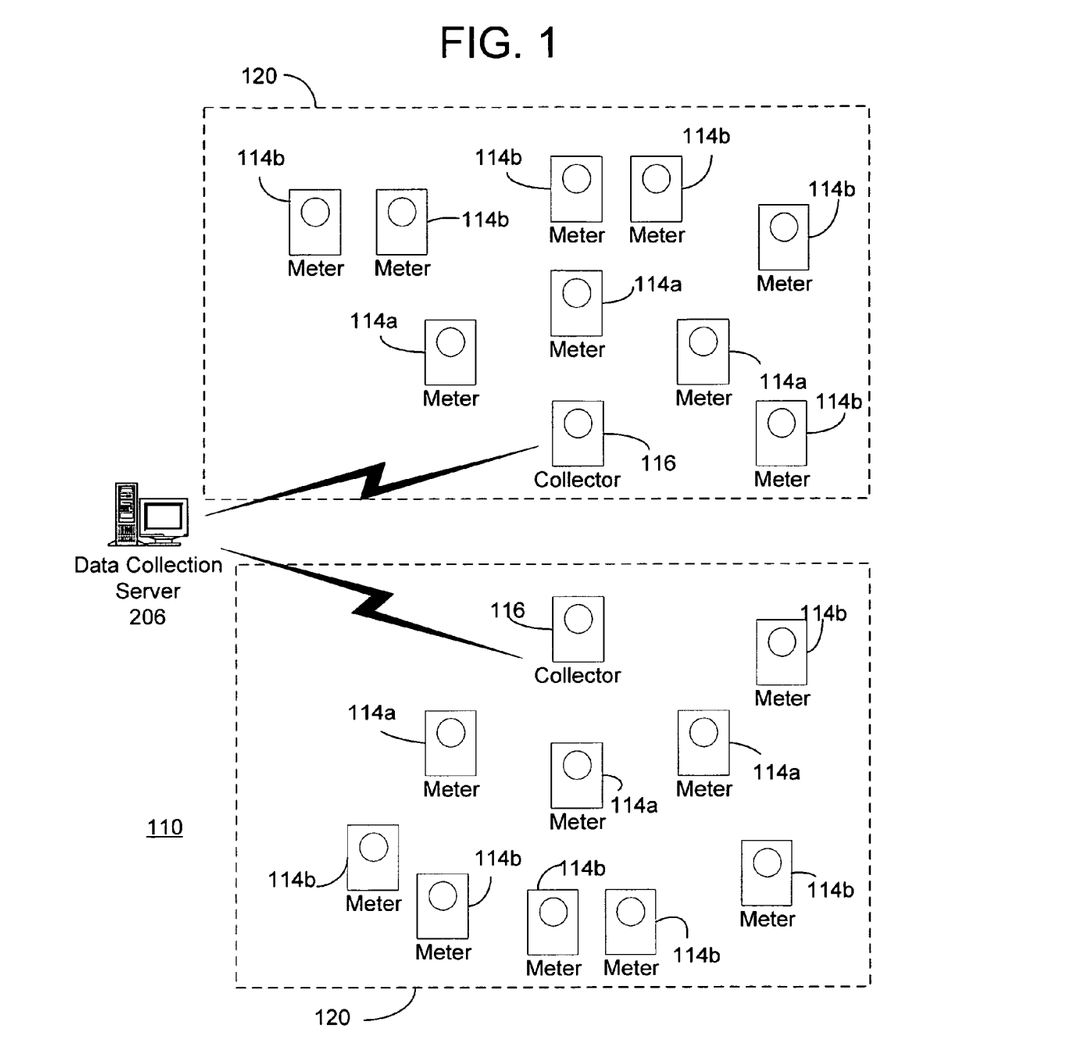
FIG. 1 is a diagram of a wireless system for collecting data from remote devices.

FIG. 1 provides a diagram of an exemplary metering system 110. System 110 comprises a plurality of meters 114, which are operable to sense and record usage of a service or commodity such as, for example, electricity, water, or gas. Meters 114 may be located at customer premises such as, for example, a home or place of business. Meters 114 may comprise an antenna and may be operable to transmit data, including service usage data, wirelessly or via wired connections. Meters 114 may be further operable to receive data wirelessly as well. In an illustrative embodiment, meters 114 may be, for example, electrical meters manufactured by Elster Electricity, LLC.

System 110 may further comprise collectors 116. Collectors 116 also may be meters operable to detect and record usage of a service or commodity such as, for example, electricity, water, or gas. Collectors 116 may comprise an antenna and may be operable to send and receive data wirelessly. In particular, collectors 116 may be operable to send data to and receive data from meters 114. In an illustrative embodiment, meters 114 and/or collectors 116 may be, for example, an electrical meter manufactured by Elster Electricity, LLC.

A collector 116 and the meters 114 for which it is configured to receive meter data define a subnet/LAN 120 of system 110. In the context of networking, meters 114 and collectors 116 may be considered as nodes in the subnet 120. For each subnet/LAN 120, data may be collected at collector 116 and periodically transmitted to a data collection server 206. The data collection server 206 may store the data for analysis and preparation of bills, for example, among other uses. The data collection server 206 may be a specially programmed general purpose computing system and may communicate with collectors 116 wirelessly or via a wireline connection such as, for example, a dial-up telephone connection or fixed wire network.

Generally, collector 116 and meters 114 may communicate with and among one another using any one of several-robust wireless techniques such as, for example, frequency hopping spread spectrum (FHSS) and direct sequence spread spectrum (DSSS) at 900 MHz. As illustrated, meters 114a may be referred to as "first level" meters that communicate with collector 116, and meters 114b may be referred to as "higher level" meters that communicate with other meters in the network and that forward information to the collector 116.

Figure 2:
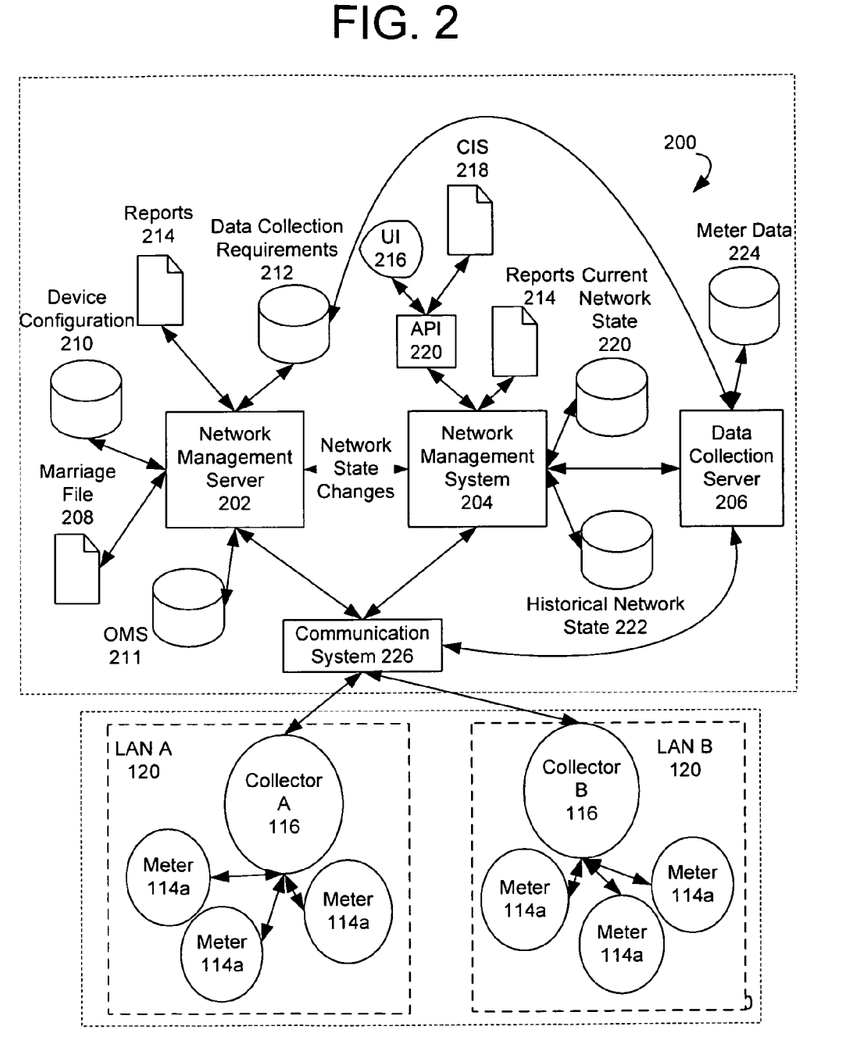
FIG. 2 expands upon the diagram of FIG. 1 and illustrates a system in which the present invention is embodied.

Referring now to FIG. 2, there is illustrated a system 200. The system 200 may include a network management server 202, a network management system (NMS) 204 and a data collection server 206 that together manage one or more subnets/LANs 120 and their constituent nodes. The NMS 204 may track changes in the network state, such as new nodes registering/unregistering with the system 200, node communication paths changing, etc. This information may be collected for each subnet/LAN 120 and may be detected and forwarded to the network management server 202 and data collection server 206.

Communication between nodes and the system 200 may be accomplished using a LAN identification, however customers also may query and communicate with nodes using their own identifier. To this end, a marriage file 208 may be used to correlate a customer serial number, a manufacturer serial number and LAN identification for each node (e.g., meters 114a and collectors 116) in the subnet/LAN 120. A device configuration database 210 may store configuration information regarding the nodes. For example, in the metering system 110, the device configuration database may include data regarding time of use (TOU) switchpoints, etc. for the meters 114a and collectors 116 communicating to the system 200. A data collection requirements database 212 may contain information regarding the data to be collected on a per node basis. For example, a user may specify that metering data such as load profile, demand, TOU, etc. is to be collected from particular meter(s) 114a. Reports 214 containing information on the network configuration may be automatically generated or in accordance with a user request.

A network management system (NMS) 204 maintains a database describing the current state of the global fixed network system (current network state 220) and a database describing the historical state of the system (historical network state 222). The current network state 220 may contain data regarding current meter to collector assignments, etc. for each subnet/LAN 120. The historical network state 222 may be a database from which the state of the network at a particular point in the past can be reconstructed. The NMS 204 may be responsible for, among other things, providing reports 214 about the state of the network. The NMS 204 may be accessed via an API 220 that is exposed to a user interface 216 and a Customer Information System (CIS) 218. Other external interfaces may be implemented as well. In addition, the data collection requirements stored in the database 212 may be set via the user interface 216 or CIS 218.

The data collection server 206 collects data from the nodes (e.g., collectors 116) and stores the data in a database 224. The data may include metering information, such as energy consumption and may be used for billing purposes, etc. by a utility provider.

The network management server 202, network management system 204 and data collection server 206 may communicate with the nodes in each subnet/LAN 120 via a communication system 226. The communication system 226 may be a Frequency Hopping Spread Spectrum radio network, a mesh network, a Wi-Fi (802.11) network, a Wi-Max (802.16) network, a land line (POTS) network, TCP/IP network, etc., or any combination of the above and enables the system 200 to communicate with the metering system 110.

Figure 3:
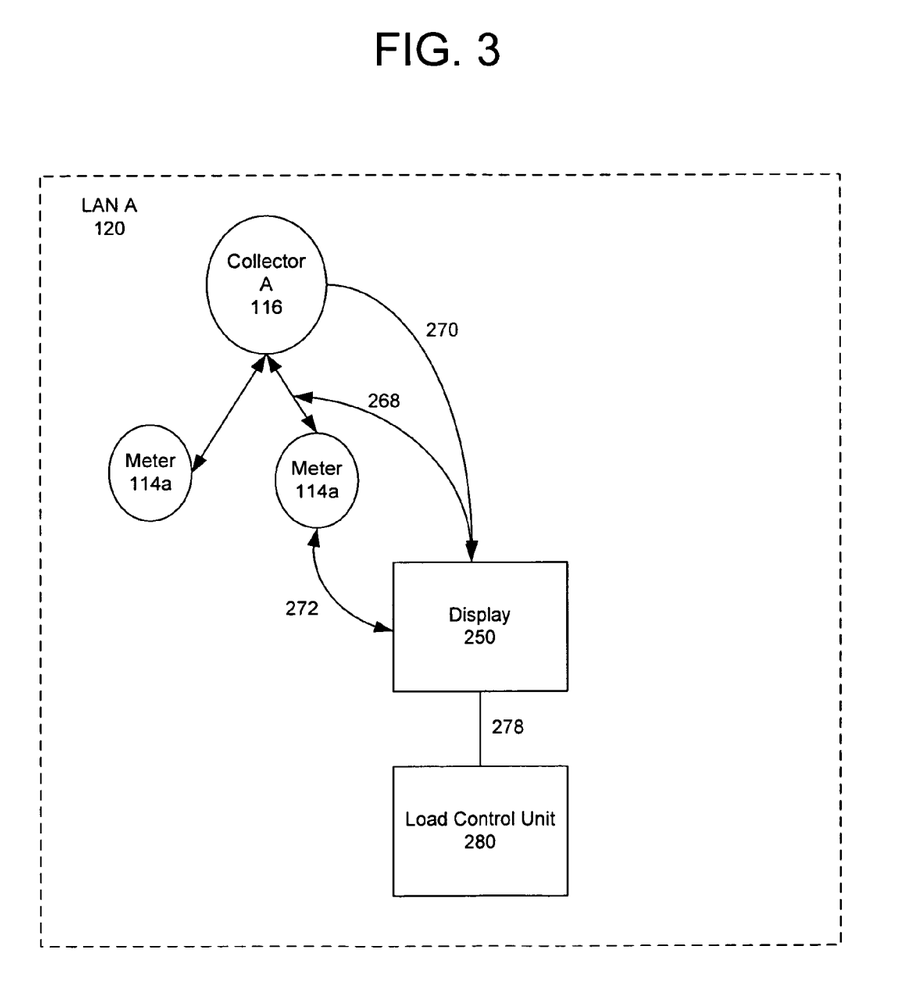
FIG. 3 illustrates exemplary communication links to an in-home display and load control device.

Referring now to FIG. 3, an in-home display 250 includes a radio system and antenna to enable it to communicate with meters 114 and collectors 116 using the existing radio infrastructure. As described above, the meters 114 and collectors 116 communicate via, e.g., Frequency Hopping Spread Spectrum radio. By communicating with the existing radio and meter firmware, the in-home display 250 can provide information to a user without significantly impacting the operation and cost of the meter 114/collector 116. A complete description of the in-home display 250 is found in application Ser. No. 11/355,548, entitled "In-Home Display that Communicates with a Fixed Network Meter Reading System," which is incorporated herein by reference in its entirety. The in-home display 250 may be provided as a separate stand-alone unit or could be integrated into another customer device such as a thermostat.

The in-home display 250 gains timely updates that may be correlated to the meter read interval by listening to the normal meter read traffic. When the associated meter 114 transmits its meter data, the display 250 recognizes the meter's unique ID and updates the display memory with the current meter read information (communication link 268). The display 250 may maintain a duplicate copy of the meter's configuration. Also, a broadcast message may be sent throughout the system 110 that is directed to the in-home displays 250 (communication link 270). After receipt of the broadcast, in-home display will randomly or via a schedule extract required information from it associated meter 114 (communication link 272). The individual displays 250 would be able to randomly select communication time windows in order to minimize contention traffic between displays or the collector could assign slot times. Using above noted solutions, the in-home display update would occur at approximately the same rate as the utility update rate.

A manual override capability may be offered to the residential or commercial owner for the instances where more up-to-date metering data is desired. The display device 250 may optionally include a "read button" that when activated, extracts the most recent meter data. The "read button" functionality may also provide a menuing system to allow the customer to extract more specific meter data than a standard update would provide using link 272.

In yet another alternative, the in-home display 250 may be placed as a node in the system 110. Here the meter read interval may not be correlated and the in-home display 250 contains the communications bound for the system 200. In this case, the collector 116 would update and read from the meter 114 and would additionally download information to the in-home display 250. This may be accomplished using link 272, where the link is a LAN communications link, such as those used between the collector 116 and the meters 114. Downloaded information could include the last meter read data, "time synch," "tier pricing" or "TOU schedule" information. Additionally, information such as energy pricing could be downloaded to the in-home display 250 to provide an accurate representation of tier or total consumption.

Customer Load Reduction

Once the in-home display 250 has retrieved the tier or pricing data, the display 250 acts as a local master controller for one or more load control units 280. The load control units 280 may be connected to the HVAC, hot water heater, or other high consumption loads on the customer premises. Load control units are available from, e.g., Cannon Technologies, Golden Valley, Minn. Communication with the load control unit 280 may be accomplished using a LAN protocol 278, such as an Energy Axis protocol (implemented by Elster Electricity of Raleigh, N.C.), 2.4 GHz ZIGBEE, X10, etc.

The in-home display 250 automatically controls loads based on, e.g., the tier or pricing data. A typical, non-limiting configuration is as follows:

| Tier   | Action                                          |
|--------|-------------------------------------------------|
| Tier A | All loads connected                             |
| Tier B | Interrupt Load 1 (HVAC)                         |
| Tier C | Interrupt Load 1 (HVAC) and Load 2 (water heater) |
| Tier D | Interrupt all loads                             |

Those of ordinary skill in the art would recognize that the above configuration could be changed or updated via the in-home display 250, and may include additional or few tiers and/or loads to be interrupted. In addition, more sophisticated algorithms may create load shedding by sending temperature set points to smart thermostat(s) in the home.

The customer may be provided an option to override the settings for some period if loss of the load is not convenient at this time. For example, if the customer did not want to interrupt the HVAC (e.g., the customer is at home during the day, small children, etc), the customer would have the option to override the interrupt and pay a higher energy rate or penalty. The in-home display 250 may log override actions that may result in a surcharge by the utility to the customer for failing to curb load at peak prices. This information would be provided to the utility via the system 110 and communications links described above.

Utility Load Shedding

In addition to the above, a load shedding command may be transmitted by the utility. The utility application (including NMS 204) may transmit the load shedding command using the TCP/IP protocol to the collector 116. Due to the time critical nature of load shedding, it is preferable to use TCP/IP and a broadband data link to reduce overall transmission times as compared with a conventional dial up solution. The collector 116 would transmit the information using, e.g., FHSS communications (ISM 900 MHz) to the in-home display 250.

Once the in-home display has received the load-shedding command, the designated loads could be interrupted immediately or according to one of the well-known load management algorithms (e.g., Versacom, Emetcon, etc.). The load control units 280 may be connected to the HVAC, hot water heater or other high consumption loads on the customer premise, as noted above.

The utility load shedding could involve various levels, depending on the power system condition. A typical non-limiting configuration is as follows:

| Load Shedding Level | Action                                          |
|---------------------|-------------------------------------------------|
| Level 1             | All loads connected                             |
| Level 2             | Interrupt Load I (HVAC)                         |
| Level 3             | Interrupt Load 1 (HVAC) and Load 2 (water heater) |
| Level 4             | Interrupt all loads                             |

Those of ordinary skill in the art would recognize that the above configuration could be changed or updated via the in-home display 250, and may include additional or few tiers and/or loads to be shed.

In addition, given load forecasting, an electric utility may predict a load shedding condition in advance. A typical example would be peak consumption during temperature extremes in the winter or summer. In this case, the utility can download load shedding times and levels to the in-home display 250. This would result in load shedding across the system within the specified time window. If needed, the utility could alter the load shedding level to a lower or higher level as required at the time peaking has been estimated to occur. Here again, it would be possible to give the consumer the opportunity to alter the load shedding for a particular load a higher energy premium or penalty. The consumer override would be transmitted back to the utility via the system 110.

Another use for the present invention would be a water or gas disconnect function. The utility may employ a valve at the water or gas meter that would prevent or limit usage to a predetermined amount (e.g., measured volume or billing limit) per billing period. Consumers could implement the disconnect if, for example, they were going to be away for some period of time, or wanted to prevent unauthorized use.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims.

For example, although a great deal of the discussion was based on the use of certain devices and communication paths, it should be appreciated that the contemplated embodiments include the use of any devices, communication paths and techniques. Moreover, although device configurations have been described herein, it should be appreciated that the devices are provided merely to provide an understanding of the many techniques contemplated by the embodiments. Those skilled in the art, having the benefit of the teachings of this specification, may affect numerous modifications thereto and changes may be made without departing from the scope and spirit of the invention.

What is claimed is:

1. A method of reducing commodity consumption at a customer location, comprising:

providing at the customer location a master controller in communication with a utility meter at the customer location, the utility meter being part of a fixed radio automated meter reading network comprising a collector and a plurality of utility meters that bi-directionally communicate wirelessly with the collector, each of the utility meters having a wireless communication path to the collector that is either a direct communication path to the collector or an indirect communication path through one or more other utility meters that serve as repeaters, and the collector receiving commodity consumption information from the plurality of utility meters;

providing at least one load control unit at the customer location;

transmitting from the collector of the fixed radio automated meter reading network to the master controller, via the utility meter at the customer location, configuration data defining loads to be interrupted; and instructing, by the master controller, said load control unit to interrupt a load based on said configuration data.

2. The method of claim 1, further comprising providing a manual override function to disable the interruption of said load.

3. The method of claim 2, further comprising:

logging each actuation of said manual override function to a log file; and providing said log file to a utility via said utility meter of said fixed radio automated meter reading network that is at said customer location.

4. The method of claim 1, further comprising defining tiers within said configuration data where successive tiers interrupt an increasing number of loads via said load control unit.

5. The method of claim 1, further comprising defining pricing data within said configuration; and instructing said load control unit based on said pricing data.

6. The method of claim 1, further comprising instructing said load control unit in accordance with temperature set points in a thermostat.

7. A method of shedding commodity consumption at a customer location, comprising:

providing at the customer location a master controller in communication with a utility meter at the customer location, the utility meter being part of a fixed radio automated meter reading network comprising a collector and a plurality of utility meters that bi-directionally communicate wirelessly with the collector, each of the utility meters having a wireless communication path to the collector that is either a direct communication path to the collector or an indirect communication path through one or more other utility meters that serve as repeaters, and the collector receiving commodity consumption information from the plurality of utility meters;

providing at least one load control unit at the customer location;

receiving at the master controller, from the collector of the fixed radio automated meter reading network and via the utility meter at the customer location, a command; and instructing, by said master controller, said load control unit to shed predetermined loads based upon receipt of said command.

8. The method of claim 7, further comprising instructing said load control unit in accordance with a load management algorithm.

9. The method of claim 7, further comprising defining load shedding levels where an increasing number of loads are shed in successive levels; and communicating a load shedding level with said command.

10. The method of claim 7, said receiving a command via said fixed radio automated meter reading network comprising:

forecasting load conditions; and forwarding load shedding times and levels to said master controller in advance of shedding said predetermined loads.

11. The method of claim 7, further comprising disconnecting a utility service at said customer location.

12. A load control system for managing loads within a customer location, comprising:

a fixed radio automated meter reading network comprising a collector and a plurality of utility meters that bi-directionally communicate wirelessly with the collector, each of the utility meters having a wireless communication path to the collector that is either a direct communication path to the collector or an indirect communication path through one or more other utility meters that serve as repeaters, and the collector receiving commodity consumption information from the plurality of utility meters, one of said utility meters being located at said customer location;

a master controller at said customer location and in communication with the utility meter of the fixed radio automated meter reading network that is located at said customer location; and a load control unit that receives instructions from said master controller to remove predetermined loads based on communications received by said master controller from the collector of said fixed radio automated meter reading network via the utility meter at said customer location.

13. The load control system of claim 12, wherein tier data is communicated to said master controller where successive tiers define an increasing number of said predetermined loads to be removed via a plurality of load control units.

14. The load control system of claim 12, wherein pricing data is communicated to said master controller and wherein said predetermined loads are removed in accordance with price points set in said pricing data.

15. The load control system of claim 12, wherein said master controller further comprises a manual override function to prevent the removal of a load.

16. The load control system of claim 15, wherein each actuation of said manual override function is logged and provided to a utility via said fixed radio automated meter reading network.

17. The load control system of claim 12, wherein TCP/IP communications is used to forward a command to a collector, and wherein Frequency Hopping Spread Spectrum (FHSS) communications is used to forward said command from said collector to said master controller via said utility meter at said customer location.

18. The load control system of claim 12, wherein load shedding levels are defined and wherein an increasing number of loads are shed in successive levels by said load control unit.

19. The load control system of claim 12, wherein load shedding times and levels are communicated to said master controller in accordance with forecasts in advance of shedding said predetermined loads.

\* \* \* \* \*